(12) United States Patent
Balasubramanian et al.

(10) Patent No.: US 9,135,116 B1
(45) Date of Patent: Sep. 15, 2015

(54) CLOUD ENABLED FILESYSTEMS PROVIDED BY AN AGENT WHICH INTERFACES WITH A FILE SYSTEM ON A DATA SOURCE DEVICE

(75) Inventors: Shankar Balasubramanian, Bangalore (IN); Anil Degwekar, Bangalore (IN); Srinivasan Ramachandran, Bangalore (IN); Anand Raj, Bangalore (IN); Deepak Visweswaraiah, Bangalore (IN)

(73) Assignee: EMC Corporation, Hopkinton, MA (US)

( * ) Notice: Subject to any disclaimer, the term of this patent is extended or adjusted under 35 U.S.C. 154(b) by 136 days.

(21) Appl. No.: 13/248,389

(22) Filed: Sep. 29, 2011

(51) Int. Cl.
*G06F 17/30* (2006.01)
*G06F 3/06* (2006.01)
*G06F 11/14* (2006.01)

(52) U.S. Cl.
CPC .......... *G06F 11/1435* (2013.01); *G06F 3/0647* (2013.01); *G06F 17/30091* (2013.01)

(58) Field of Classification Search
CPC .......... G06F 11/1435; G06F 17/30091; G06F 3/0647
USPC .......................................................... 707/827
See application file for complete search history.

(56) References Cited

U.S. PATENT DOCUMENTS

| | | | |
|---|---|---|---|
| 5,832,501 A * | 11/1998 | Kain et al. ..................... | 707/754 |
| 6,269,382 B1 * | 7/2001 | Cabrera et al. ........................ | 1/1 |
| 6,526,418 B1 * | 2/2003 | Midgley et al. ............... | 707/640 |
| 6,625,623 B1 * | 9/2003 | Midgley et al. ............... | 707/640 |
| 6,782,389 B1 * | 8/2004 | Chrin et al. ........................... | 1/1 |
| 6,952,737 B1 * | 10/2005 | Coates et al. .................. | 709/229 |
| 7,475,199 B1 * | 1/2009 | Bobbitt et al. ................. | 711/154 |
| 7,640,409 B1 * | 12/2009 | Stafford et al. ............... | 711/162 |
| 7,685,128 B2 * | 3/2010 | Anderson et al. ............. | 707/770 |
| 7,788,302 B1 * | 8/2010 | Thakur et al. ................. | 707/827 |
| 7,849,262 B1 * | 12/2010 | Glade et al. ................... | 711/114 |
| 7,873,601 B1 * | 1/2011 | Kushwah ....................... | 707/654 |
| 8,214,621 B2 * | 7/2012 | Obr et al. ....................... | 711/173 |
| 8,266,192 B2 * | 9/2012 | Nemoto et al. ............... | 707/821 |
| 8,315,973 B1 * | 11/2012 | Kaiser et al. .................. | 707/609 |
| 8,627,033 B2 * | 1/2014 | Martinsen ..................... | 711/165 |
| 8,849,955 B2 * | 9/2014 | Prahlad et al. ................ | 709/219 |
| 8,935,307 B1 * | 1/2015 | Srinivasan et al. ............ | 707/827 |
| 9,009,219 B2 * | 4/2015 | Chawla et al. ................ | 709/203 |
| 2005/0097142 A1 * | 5/2005 | Best et al. ...................... | 707/200 |
| 2006/0235871 A1 * | 10/2006 | Trainor et al. ................ | 707/102 |
| 2007/0016822 A1 * | 1/2007 | Rao et al. ........................... | 714/4 |

(Continued)

OTHER PUBLICATIONS

Lynne, "Architecture for Serving Large Read Only Objects from a Host", Jul. 1, 1992, IBM Technical Disclosure Bulletin, vol. 35, issue 2 pp. 101-105.*

(Continued)

*Primary Examiner* — Phuong Thao Cao
(74) *Attorney, Agent, or Firm* — Van Pelt, Yi & James LLP

(57) ABSTRACT

Information is managed by receiving at a data source device, from an application running on a data source device, an instruction associated with a file system object. It is determined at the data source device if the instruction is able to be satisfied by a file system running on the data source device. If it is determined that the instruction is not able to be satisfied by the file system, the instruction is performed without the services of the file system; the application is unaware that the file system object is managed by an entity other than the file system running on the data source device.

31 Claims, 11 Drawing Sheets

(56) References Cited

U.S. PATENT DOCUMENTS

| | | | |
|---|---|---|---|
| 2009/0043971 A1* | 2/2009 | Kim | 711/150 |
| 2009/0249005 A1* | 10/2009 | Bender et al. | 711/162 |
| 2010/0199174 A1* | 8/2010 | Leonov et al. | 715/255 |
| 2010/0287219 A1* | 11/2010 | Caso et al. | 707/827 |
| 2010/0293147 A1* | 11/2010 | Snow et al. | 707/640 |
| 2010/0332401 A1* | 12/2010 | Prahlad et al. | 705/80 |
| 2011/0066668 A1* | 3/2011 | Guarraci | 707/831 |
| 2011/0078118 A1* | 3/2011 | Kushwah | 707/646 |
| 2011/0087696 A1* | 4/2011 | Lacapra | 707/769 |
| 2011/0276656 A1* | 11/2011 | Knapp et al. | 709/219 |
| 2011/0289310 A1* | 11/2011 | Selgas et al. | 713/150 |
| 2011/0314071 A1* | 12/2011 | Johnson et al. | 707/827 |
| 2011/0314072 A1* | 12/2011 | Resch et al. | 707/827 |
| 2012/0054325 A1* | 3/2012 | Backa | 709/223 |
| 2012/0101995 A1* | 4/2012 | Agetsuma et al. | 707/644 |
| 2012/0151250 A1* | 6/2012 | Saika | 714/4.11 |
| 2012/0254340 A1* | 10/2012 | Velummylum et al. | 709/213 |
| 2013/0018939 A1* | 1/2013 | Chawla et al. | 709/203 |
| 2014/0244937 A1* | 8/2014 | Bloomstein et al. | 711/136 |

OTHER PUBLICATIONS

Lynne, Architecture for Serving Large Read Only Objects from a Host Jul. 1992, IBM Technical Disclosure Bulletin volume No. 35 issue 2 pp. 101-105.*

"A Better Approach to Managing File System Data: Lowering Costs, Reducing Risk and Managing Data Growth", EMC Corporation White Paper, Oct. 31, 2006.

"Disaster Recovery in an EMC Diskxtender for Windows Environment: Recommended best practices", EMC Corporation White Paper, May 2011.

"Backup and Recovery of Data Managed by EMC Diskxtender for Windows: Recommended best practices", EMC Corporation White Paper, Feb. 2011.

"EMC DiskXtender for UNIX/Linux: Automated, policy-based file system archiving", EMC Corporation Data Sheet, 2005.

"EMC DiskXtender for Windows: Automated, policy-based file system archiving for long-term data retention", EMC Corporation Data Sheet, 2008.

* cited by examiner

CLOUD ENABLED FILESYSTEMS PROVIDED BY AN AGENT WHICH INTERFACES WITH A FILE SYSTEM ON A DATA SOURCE DEVICE

BACKGROUND OF THE INVENTION

Devices such as computers and smartphones are storing more and more information, such as photographs, documents, videos, device configurations, applications settings and user preferences. It would be desirable if new techniques could be developed which enable existing data management and/or access services (e.g., related to storage capacity limits and/or backup and recovery) to be provided in a more efficient or convenient way, and/or if such new techniques provided new ways of accessing and/or managing information.

BRIEF DESCRIPTION OF THE DRAWINGS

Various embodiments of the invention are disclosed in the following detailed description and the accompanying drawings.

DETAILED DESCRIPTION

Figure 1:
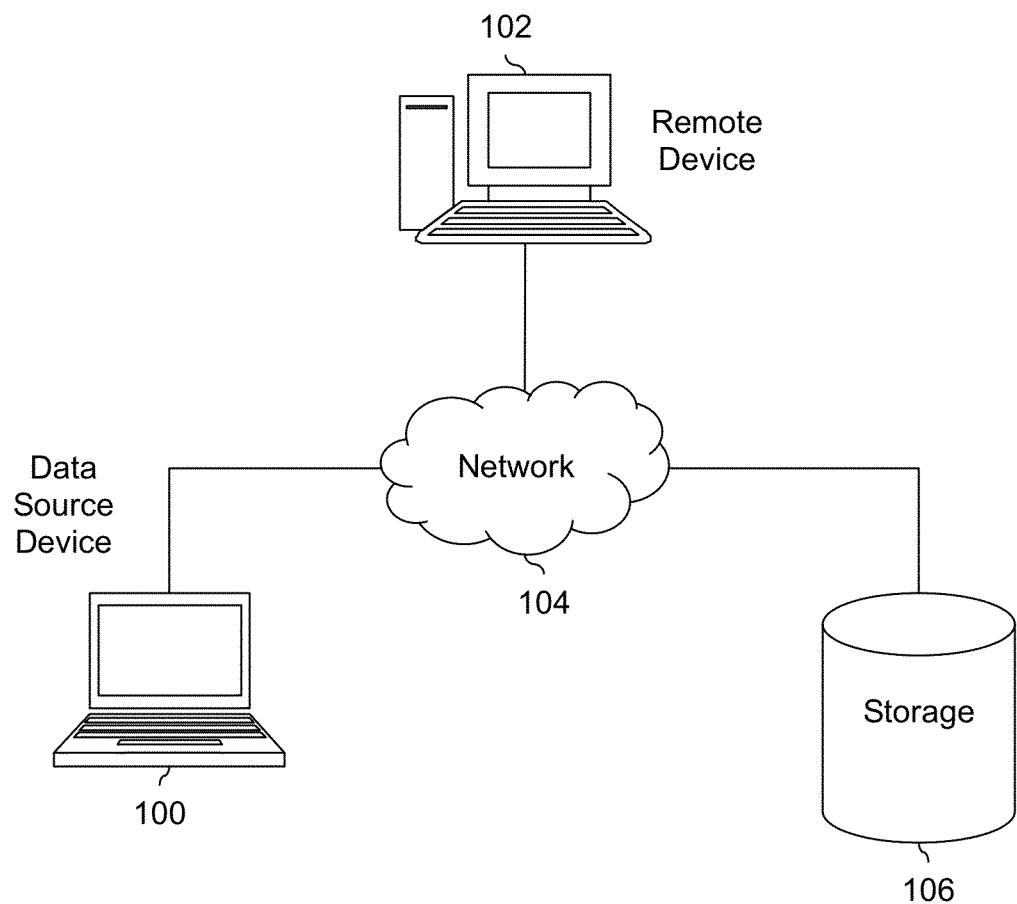
FIG. 1 is a diagram showing an embodiment of a system in which the storage capacity of a data source device is expanded by transferring data and/or metadata to a remote storage device.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

What is described herein is a technique for managing information at a data source device using a storage device that accessible via a network (e.g., cloud storage). At the data source device, an instruction relating to a file system object is received from an application running on the data source device. For example, there may be an agent configured to operate between an application and a file system of an operating system, so that any instructions or communications between the two must first pass through the agent. It is determined where to send the instruction. For example, an agent may decide to send the instruction to the file system, the agent may divert an instruction to an entity other than the file system (such as a storage device accessible via a network) or the agent may process the instruction itself; the file system never receives the instruction in the latter two cases. The instruction is then sent appropriately. In some cases, the file system object is being migrated from the data source device to the storage and a delete instruction (e.g., generated by the agent as opposed to the application) is sent to the file system so that the copy of the file system object on the data source device is deleted. The agent may track where metadata and data corresponding to each file system object is stored (e.g., on a data source device, on a storage device accessible via a network or both) so that when an application requests information for a particular file system object the agent knows where to send the instruction to. In some cases, metadata for a given file system object is managed differently than the corresponding data (e.g., one is stored on multiple devices while the other is stored only on one device).

FIG. 1 is a diagram showing an embodiment of a system in which the storage capacity of a data source device is expanded by transferring data and/or metadata to a remote storage device. In the example shown, data source device 100 and storage 106 are connected via network 104. In various embodiments, network 104 uses or otherwise includes Internet protocols, mobile data networks (e.g., 3G or 4G), wired/wireless network protocols (e.g., IEEE 802.3 or IEEE 802.11), etc. Data source device 100 is configured to store at least some of its file system objects on storage 106, for example if or as needed. File system objects include two types of information: data and metadata. Some examples of file system objects include (but are not limited to): files (e.g., images, videos, word processing files, etc.), directories, system settings (e.g., user preferences, application or device configurations, etc.), application data (e.g., application settings, saved tokens and certificates, etc.). Storage 106 permits the storage capacity of data source device 100 to be expanded beyond that of its native or built-in capacity. For example, if data source device includes a 100 GB hard disk or solid state drive, storing data on storage 106 permits more than 100 GB worth of data to be stored.

In various embodiments, information from data source device 100 is stored on storage 106 in a variety of ways. In some embodiments, information is stored on data source device 100 (e.g., on a local hard disk drive of data source device 100) and a corresponding copy is also stored on storage 106. In some other embodiments, one or more pieces of metadata are stored on data source device 100, but the corresponding data is only kept on storage 106 and not on data source device 100. Using a file as an example (e.g., a Microsoft Word document), the contents of the file (i.e., the data, as opposed to the metadata, corresponding to the file) are only kept on storage 106 but not on data source device 100 and metadata for that file is stored on data source device 100. Some examples of metadata corresponding to a file include: the name of a file, a (e.g., file system) path at which a file is located, size of a file, a creator, a creation timestamp, a modification timestamp, permissions (e.g., read/write/execute permissions such as those set or modified using the UNIX chmod command, encryption or other security settings, etc.), one or more identifiers by which the file is known to other entities (e.g., an application on data source device 100 or an agent running on storage 106), etc. In some embodiments, metadata is also stored on storage 106, for example because the system permits access of the data stored on storage 106 from remote device 102 and this metadata may be used in the process of providing a requested file (as an example) to remote device 102 in a form that is meaningful or comprehensible to an application or user on remote device 102. For example, the metadata may include the logical or physical locations of the content of a request file and this may be used by remote device 102 to retrieve the file in response to an access request. In some embodiments, metadata stored on storage device 106 includes some other information such as the identity of the data source 100.

In various embodiments, various techniques are used in deciding whether to store two copies (e.g., one copy on data source device 100 and one copy on storage 106) as opposed to storing information on storage 106 and not on data source device 100. In some embodiments, register settings are used to configure data source device 100 to always operate in one manner (e.g., to always store a copy on data source device 100 and a copy on storage 106). In some embodiments, a system is configured to make this determination, for example based on current conditions. For example, if the native or built-in storage capacity of data source device 100 is greater than a certain threshold, (e.g., 80 GB or more) then a first and second copy are stored on data source device 100 and storage 106, respectively. Should the storage capacity be less than the threshold, at least some information is stored only on storage 106 but not on data source device 100. In some embodiments, storage utilization (e.g., a percentage of storage occupied) is used. In some cases, one file system object is stored in one manner (e.g., on both data source device 100 as well as storage 106) while simultaneously another is stored in another manner (e.g., only on storage 106 but not on data source device 100). In some embodiments, a file system object is stored only on data source device 100 but not on storage 106 (e.g., because a user has indicated protection is not needed for that file system object).

In some embodiments, storage 106 is a subscription storage service. For example, a user may pay to have a certain amount of storage capacity on storage 106 and is given one or more credentials (e.g., a username, a key, and/or a password) to add new data, access stored data, etc. Credentials may also be referred to as authentication information. In some embodiments, data source device 100 is configured to communicate or otherwise interoperate with a plurality of storage providers. For example, data source device 100 may have the ability to interoperate with multiple cloud storage providers such as EMC Atmos and Amazon Cloud Drive. An example of interaction with storage 106 (including how to specify at data source device 100 which storage provider to access and exchange of credentials between data source device 100 and storage 106) is described in further detail below.

In some embodiments, one or more policies are applied at storage 106. For example, a policy may relate to retention compliance (e.g., document retention policies such as for discovery in litigation, record keeping, etc.). This may be desirable since data retention and/or compliance needs can change over time and implementing a new policy may be difficult if information is spread out over many devices. Using the techniques described herein, there does not need to be an update at data source device 100 should a policy change. Rather, updates to policies or processes that enforce them are implemented on storage 106. For large corporations with many employees, updating a policy or process at a central server or central storage may be easier to manage than getting all of the employees to update their devices whenever a policy changes (e.g., keep email records for 7 years instead of 5 years, begin archiving, etc.). In some embodiments, the polices applied at storage 106 are based on the metadata stored by the data source 100.

One benefit to the techniques described herein is simplified and automated backup and recovery. For example, if data source device 100 fails or is misplaced, recovery of at least some information is possible because a copy is stored on storage 106. The transfer or copying of data from data source device 100 to storage 106 is performed automatically by data source device 100. In contrast, manual backup relies upon a user, leaving data vulnerable to failure or loss of the data source device since users may fail to perform backups on a frequent enough basis.

Another advantage to the technique described herein is that in some embodiments, maintenance is managed by another person. For example, if storage 106 is cloud storage and/or subscription based, a storage service manages and maintains storage 106. This may be preferable to buying new hardware, maintaining it and replacing it when its useful lifetime is over. Another advantage is that storage capacity can be easily expanded. Instead of having to buy more storage, a person can contact a storage provider managing storage 106 and buy more storage.

Although remote device 102 is shown as a desktop computer and data source device 100 is shown as a laptop, a variety of device may be used. In various embodiments, data source device 100 is a laptop, a smart phone, etc.

Figure 2:
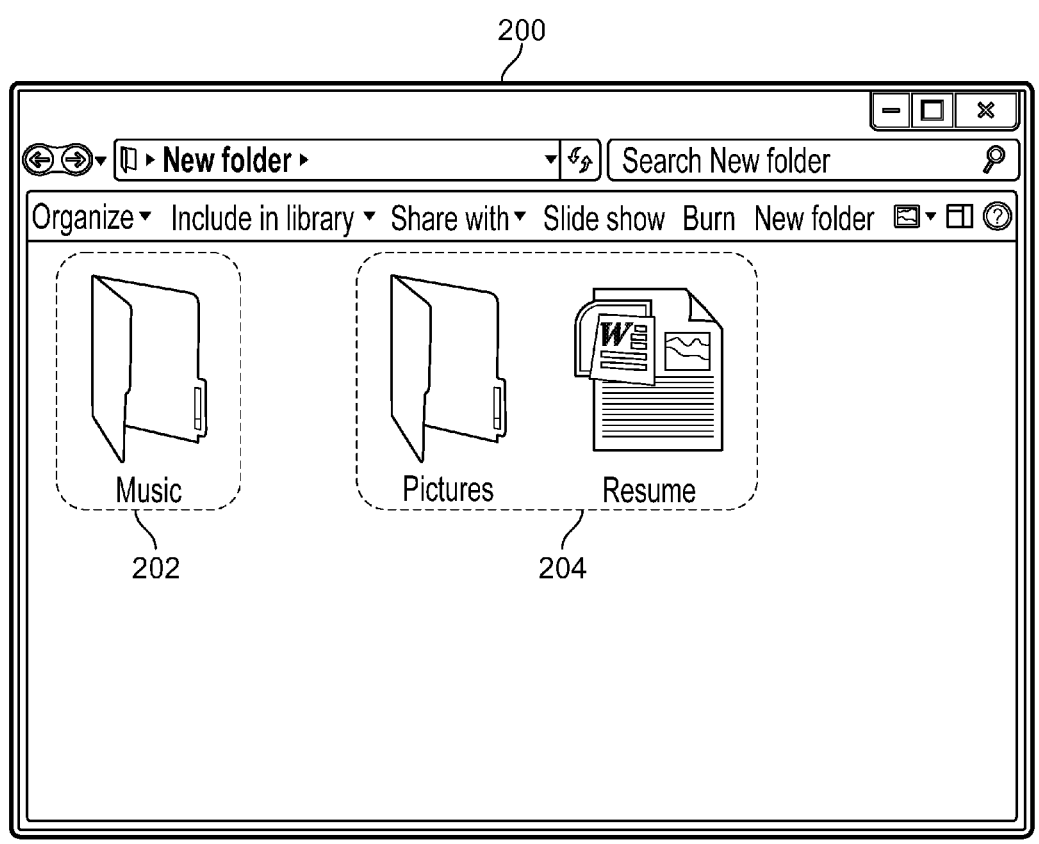
FIG. 2 is a diagram showing an embodiment of a file system graphical user interface (GUI).

FIG. 2 is a diagram showing an embodiment of a file system graphical user interface (GUI). In the example shown, file system GUI 200 shows the contents of a directory, in this example called "New folder." This directory includes a directory called "Music," a directory called "Pictures" and a file called "Resume."

The contents of the directory are grouped into two groups: group 202 and group 204. Group 202 (which includes the Music directory and all directories and files beneath it) is stored on a data source device (e.g., 100 in FIG. 1) but not on storage accessible via a network (e.g., 106 in FIG. 1). Group 204 (which includes the Pictures directory, all directories and files beneath the Pictures directory and the Resume file) is stored on remote storage (e.g., 106 in FIG. 1) but not on a data source device (e.g., 100 in FIG. 1). Metadata associated with group 204 in some embodiments is stored on a local source device.

The data management technique described herein is transparent to a user of a data source device, such as 100 in FIG. 1. For example, the dashed lines showing groups 202 and 204 in file system GUI 200 are not presented to the user and therefore the user is unaware of those groupings. From the point of view of other entities on a data source device, such as an application, they too are not necessarily aware of where or how a file system object is stored. For example, if the application Microsoft Word requested the Resume file, the application would not be able to detect whether the data came from a drive mounted on a data source device as opposed to being stored on remote storage. Similarly, file system GUI 200 (which may be thought of as an application) is not able to detect where group 202 or 204 is. To file system GUI 200 there is no difference between the two groups.

In some embodiments, a decision how or where to store information (e.g., store on both a data source device and remote storage, or store only on one of the two) is based upon frequency of access. Group 204 (comprising the resume file and Pictures directory) is accessed relatively infrequently whereas group 202 (the Music directory) is accessed more frequently. To reduce response time and/or access requests over a network, frequently accessed information (e.g., on a relative scale or on an absolute scale) is stored on a local source device, at least in this embodiment.

Referring back to FIG. 1, file system objects originating from data source device 100 which are stored on storage 106 are available via remote device 102. For example, from an Internet browser application (e.g., Mozilla Firefox or Microsoft Internet Explorer) running on remote device 102, information stored on storage 106 may be accessed. This may be attractive if data source device 100 is not available, for example because it has been lost, is not powered on or is not connected to network 104. The following figure shows an example interface from which data on storage 106 is accessed from remote device 102.

Figure 3:
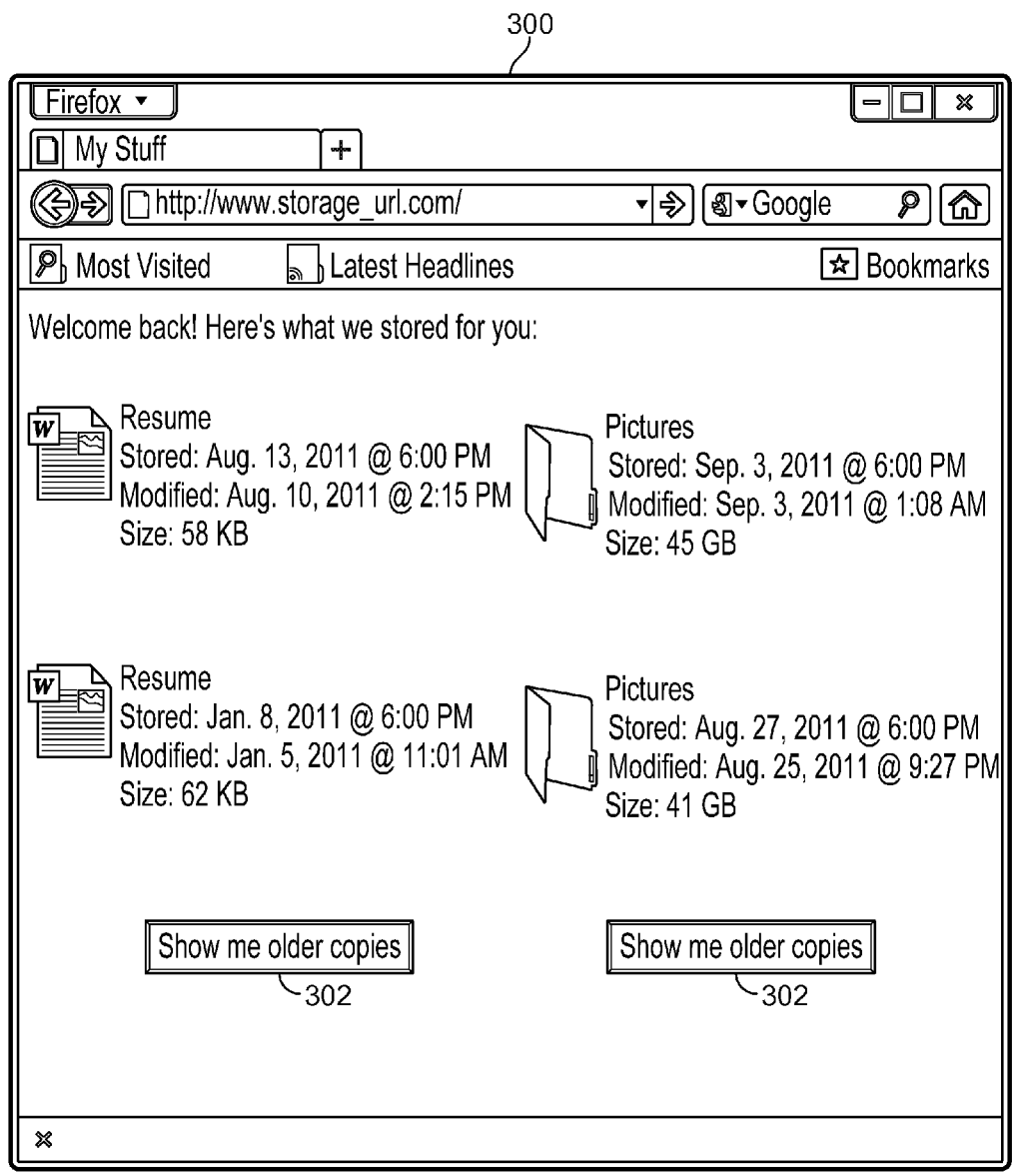
FIG. 3 is a diagram showing an embodiment of an interface configured to provide access to file system objects stored on a storage device accessible via a network.

FIG. 3 is a diagram showing an embodiment of an interface configured to provide access to file system objects stored on a storage device accessible via a network. In the example shown, an Internet browser application is used where a user goes to the website of a storage provider (www.storage_url.com in this example) and exchanges one or more credentials (e.g., a username, password or token) with the storage provider in order to obtain access to stored data. The example uniform resource locator (URL) www.storage_url.com may correspond to or otherwise be associated with storage 106 shown in FIG. 1. After successfully negotiating any verification or security procedures, a user is presented with an interface for accessing stored data, such as interface 300.

In this example, group 202 from FIG. 2 is not stored on a storage device accessible via a network and group 204 is. As a result, the contents of group 202 are not presented in interface 300 because they are not stored on such a storage device and the contents of group 204 are presented in interface 300 because they are. For each file system object, interface 300 shows the name (e.g., Resume), storage timestamp (e.g., Aug. 13, 2011 @ 6:00 PM), modification timestamp (e.g., Aug. 10, 2011 @ 2:15 PM) and size (e.g., 58 KB). In this example, two versions of each file system object are shown. If older versions are desired, a user can press one of buttons 302 and interface 300 will present one or more older versions. To access a particular file system object, a user may use a mouse and double click on the corresponding icon and/or description. Double clicking on one of the Pictures directory will cause the contents of the Pictures directory (at the corresponding time of storage) to be presented to the user.

In various embodiments, interface 300 provides a variety of tools or services for accessing and manipulating data. For example, if the Internet browser application which presents interface 300 is running on remote device 102 from FIG. 1, then a user may be able to populate remote device 102 with the data shown. For example, by selecting one or more versions of a file system object and then using a right-select from a mouse (not shown), a "download selected" action may be initiated which causes the selected versions to be downloaded to a device on which the Internet browser application is running. In some embodiments (not shown), interface 300 includes a button labeled "download latest versions of all" to provide an easy way to populate a device with the latest versions of the stored file system objects. In one example application with reference to FIG. 1, a user has misplaced data source device 100 and is populating remote device 102 (a replacement for data source device 100) with the latest version stored on storage 106.

The following figures show some embodiments of agents on a data source device which are configured to perform the data management techniques described herein. In some other embodiments, the techniques described herein are implemented in some other manner.

Figure 4:
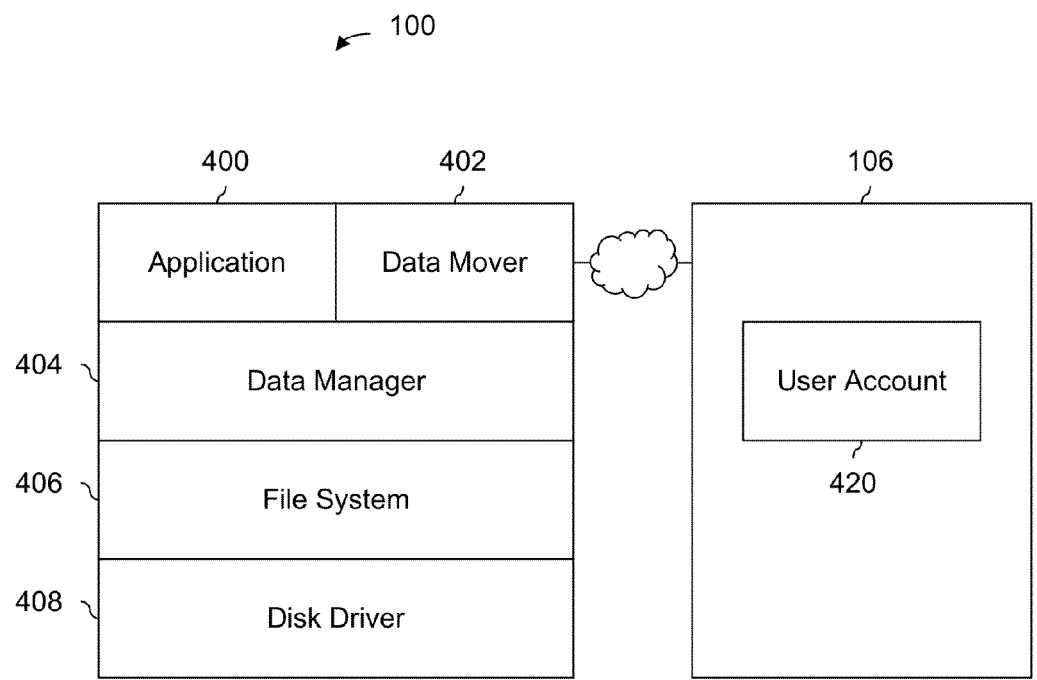
FIG. 4 is a diagram showing an embodiment of a data manager and data mover on a data source device configured to manage file system objects on a data source device and storage device accessible via a network.

FIG. 4 is a diagram showing an embodiment of a data manager and data mover on a data source device configured to manage file system objects on a data source device and storage device accessible via a network. In some embodiments, data source device 100 from FIG. 1 is implemented as shown. In this example, application 400 and data mover 402 sit on top of data manager 404. Data manager 404 sits on top of file system 406, which in turn sits on top of disk driver 408. For example, a data source device may have built-in hard disk drive system and disk driver 408 is used to access (e.g., write to and read from) the hard disk drive system. Some other types of storage media (e.g., solid state memory such as Flash) may use other drivers.

Application 400 provides access to and manipulation of file system objects, for example in response to user instructions. Some example applications include Windows Explorer, word processing applications, spreadsheet/database applications, Internet browser applications, etc. In some cases, more than one application is installed on a data source device and in some cases a particular file system object can be accessed by more than one application. Instructions associated with a desired file system object are passed from application 400 to data manager 404. In one example, application 400 has a unique identifier for each file system object in a file system and some example commands passed from application 400 to data manager 404 include: "read <file system object identifier>" or "save <data> as <file system object identifier>." In some embodiments, multiple versions of a file system object are stored and an application is interested in a specific version (e.g., application 400 is a backup and restore application). In such cases, application 400 may specify a version or timestamp to data manager 404.

Data manager 404 is responsible for handling instructions passed to it from application 400, as well as tracking where a file system object is stored (e.g., only on a data source device, only on remote storage or on both). For example, if application 400 requests access to information which is stored only on data source device 100, then the access request is passed to file system 406. If application 400 requests access to information which is only stored on storage 106, then the access request is passed to data mover 402. Upon return of the requested information from data mover 402 or file system 406, the returned information is presented to application 400. Requested information may include metadata for a file system object, data (e.g., contents) of a file system object or both metadata and data.

Data mover 402 is responsible for communicating with storage 106 to perform an instruction passed to it by data manager 404. This includes recording and exchanging a location or address associated with storage 106 (e.g., in the form of an IP address or a URL) and any credentials required by storage 106 (e.g., a username, password or token) in order to access user account 420 on storage 106. In some embodiments, storage 106 uses different identifiers and/or manages data in smaller units compared to data manager 404 and data mover 402 maintains a mapping of identifiers from one format to another. For example, data manager 404 may specify data at a file system object level but storage 106 specifies information at the block level; data mover 402 in some embodiments is responsible for mapping a file identifier to one or more block identifiers.

Storage 106 includes user account 420 in which data from data source device 100 is stored. User account 420 may be a logical partition as opposed to a physical partition, and the size of user account 420 may depend upon a purchased plan. For example, storage 106 may be cloud storage where a user has a subscription for a specified amount of storage capacity which is accessible from anywhere via the Internet. In embodiments where data source device 100 and storage 106 are connected via the Internet, various Internet protocols and access techniques may be used, such as the representational state transfer application programming interface (REST API).

During an installation process, data manager 404 and data mover 402 are installed on a data source device. Data mover 402 and data manager 404 run on top of file system 406, which is part of an operating system. To install data manager 404 and data mover 402 therefore does not require modification of and/or installation of a new operating system (e.g., Microsoft Windows), nor a new file system (e.g., New Technology File System (NTFS)). One benefit to this architecture is that the techniques described herein can be installed on a data source device without deleting existing data on that device. Installing a new operating system and/or new file system may wipe out data stored on the data source device, which is undesirable. Another benefit is that no cooperation or agreement with companies that develop and produce operating systems or file systems is required. The techniques described herein can be performed without having to add any hooks into an operating system or file system.

The following figures show some examples of a data mover and a data manager.

Figure 5:
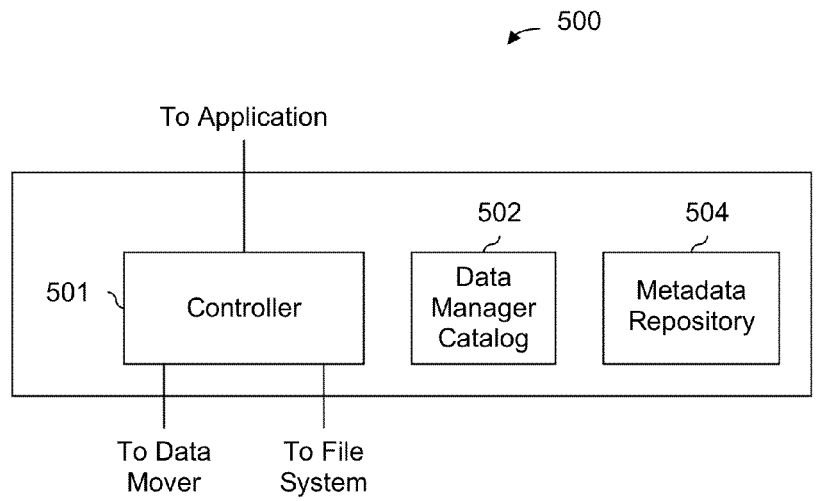
FIG. 5 is a diagram showing an embodiment of a data manager.

FIG. 5 is a diagram showing an embodiment of a data manager. In some embodiments, data manager 404 from FIG. 4 is implemented as shown; in some other embodiments, a data manager is implemented in some other manner. In the example shown, data manager 500 includes controller 501, data manager catalog 502 and metadata repository 504. In some embodiments, the data manager catalog 502 and/or the metadata repository 504 are stored inside the file system 406.

In general, data manager 500 tracks and manages the locations of metadata and data and specifically if data and metadata are stored locally on a data source device (e.g., by a data manager or a file system), remotely on storage or some combination. In this example, a data manager only manages metadata but no data and only for certain file system object and/or when certain conditions are satisfied. Data and its corresponding metadata can be stored in various combinations and some examples are described in further detail below. In some embodiments, a data manager is configured to always operate in a certain way (e.g., using register settings, a data manager is instructed to keep metadata for all file system objects under its management but no corresponding data and keep metadata and data for all file system objects on remote storage). In some embodiments, a data manager is configured to copy or migrate metadata and/or data based on capacity and/or a percent used.

Controller 501 interfaces with an application (e.g., application 400 in FIG. 4), a data mover (e.g., data mover 402 in FIG. 4) and a file system (e.g., file system 406 in FIG. 4). Commands, requests and/or instructions (hereinafter generally referred to as instructions) are intercepted by controller 501 from an application. For example, Windows Explorer may send an instruction to obtain the contents of a directory. Controller 501 determines where to send the instruction from the application (e.g., to a data mover or to a file system) and forwards it accordingly. This determination is done using the information stored in data manager catalog 502. In some embodiments, the instruction is processed by the data manager without sending the instruction to a data mover or a file system.

Data manager catalog 502 includes an identifier by which a file system object is known to an application (550). An instruction intercepted from an application will include this identifier, and an appropriate row is looked up from data manager catalog 502 using this value. For each file system object tracked in data manager catalog 502, the metadata location (552), data location (554), identifier by which a file system object is known to a file system (558) and identifier by which a file system object is known to a data mover (560) is kept. In some cases, certain fields are not relevant and the field is blank or ignored. In a background process, data manager 500 may copy or migrate metadata or data from a data source device to remote storage and records this information in data manager catalog 502 by updating the appropriate entry or creating a new one.

To illustrate the various storage combinations for data and its corresponding metadata, as well as how data manager operates, the following read instruction examples are presented. Although not discussed in this figure, a copy or migration process would update the appropriate fields and/or rows if needed.

In response to intercepting an instruction from an application to return the contents (i.e., data) of file system object A1, controller 501 accesses row 562 in data manager catalog 502. The data and its corresponding metadata are managed by both the file system and remote storage as indicated in row 562, so the instruction can be passed to either a data mover (to obtain the requested information from remote storage) or a file system (to obtain the requested information from local or built in storage). In some embodiments, a data manager in this situation is configured to always send the instruction to the file system since execution of the instruction by the file system may be faster. In some embodiments, a decision is made based upon current conditions, such as available processing resources on the data source device, available network bandwidth to the remote storage, etc. Since the instruction is passed to a file system, in this example the identifier stored in column 558 is obtained and an appropriate instruction with the identifier B1 is passed to the file system. If an instruction were passed to a data mover, then the identifier C1 would be obtained from column 560 and the identifier C1 along with an appropriate instruction is passed to a data mover.

In the event a read instruction with the identifier A2 is intercepted from an application, row 564 is obtained from data manager catalog 502. In this case, the metadata is stored both by a storage device accessible via a network as well as the data manager and the data is only stored on storage. As such, there is no identifier by which the file system object is known to the file system since it is not kept or otherwise managed by the file system object. Accordingly, the instruction is passed on to and serviced by a data mover, which knows the file system object by the identifier C2 since both the metadata and data are required to satisfy the instruction. In this example, the metadata for this file system object is stored in metadata repository 504. Metadata repository is used to store metadata for those file system objects for which only the metadata (but not the corresponding data) is kept on a data source device by the data manager.

In the example of row 566, the metadata and data are stored on a storage device accessible via a network but not by a file system on a data source device. There is therefore no identifier by which the file system object is known to the file system (558) but there is an identifier by which the file system object is known to a data mover. No metadata for this file system object is stored by the data manager, so there would be no metadata corresponding to this file system object in metadata repository 504.

The metadata and data corresponding to row 568 are both stored by a file system on a data source device, but neither the metadata nor the data are stored on remote storage. Column 560 is therefore empty for this row.

Figure 6:
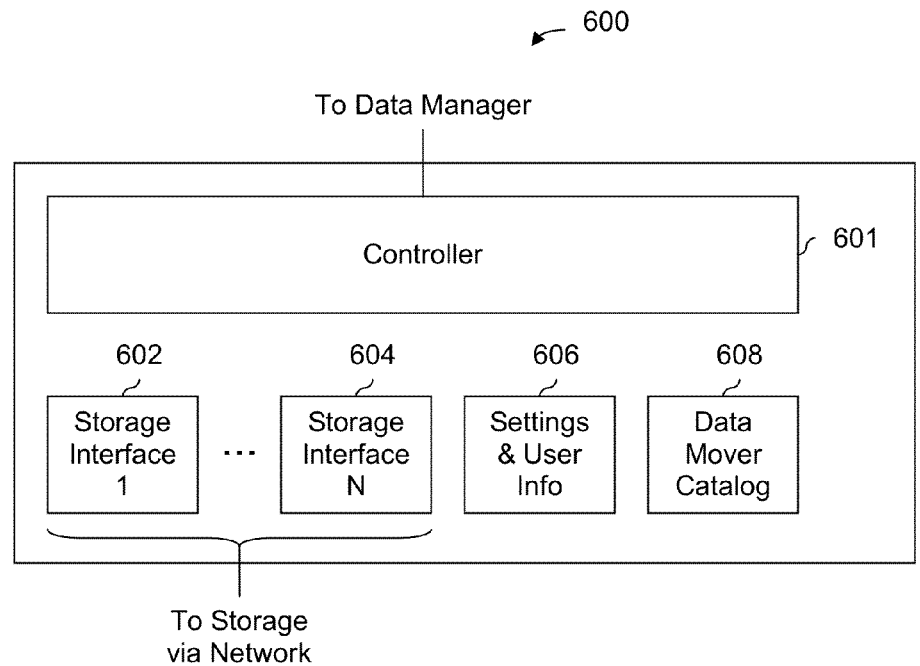
FIG. 6 is a diagram showing an embodiment of a data mover.
Figure 6:
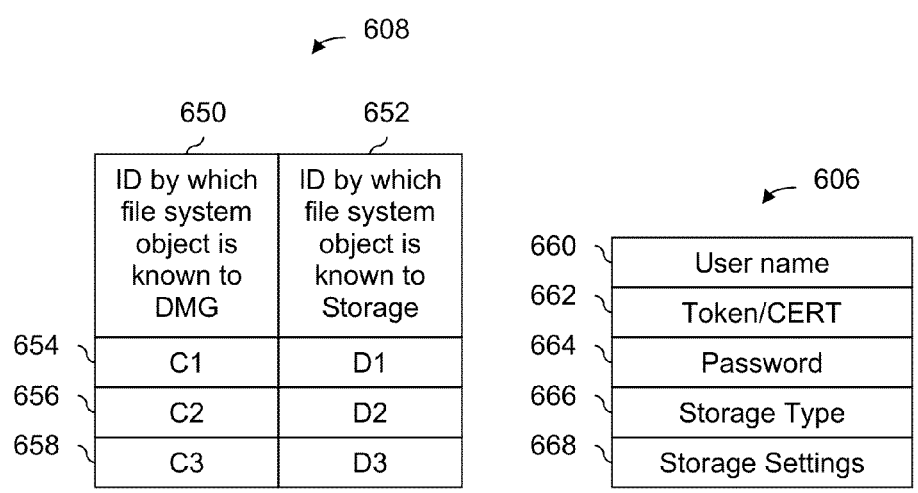

FIG. 6 is a diagram showing an embodiment of a data mover. In some embodiments, data mover 402 from FIG. 4 is implemented as shown; in some other embodiments, a data mover is implemented in some other manner. In the example shown, data mover 600 includes a controller (601), multiple storage interfaces (602 and 604), settings and user information (606) and a data mover catalog (608). Data mover 600 is responsible for interfacing with storage via a network (not shown), for example in response to instructions from a data manager (not shown).

Controller 601 receives an instruction from a data manager, for example to write (read) metadata and/or data to (from) storage which is accessible via a network. To generate an instruction that the storage is able to process, various pieces of information are obtained. The follow steps may be performed in any order.

First, controller 601 determines which of the N storage interfaces 602 and 604 to use. In this example, data mover 600 is configured to support multiple storage types and each of storage interfaces 602-604 supports a different type of storage interface or storage provider. During an initialization process, it is determined which storage interface is the appropriate one to use (e.g., by asking a user or probing storage target). Once determined, the appropriate storage interface is stored in storage type 666 of settings and user information 606. In some embodiments, the same file system object may be stored on a plurality of storage interfaces, for example to provide redundancy.

Controller 601 then obtains any credentials required to access a user account on storage. In this example, this information is kept in settings and user information 606 in the username field (660), token and/or certificate field (662) and password field (664). Settings and user information 606 may also be used to store any other storage settings. In one example, suppose a storage provider lets each user specify whether their account can only be accessed via encrypted communication. This setting may be recorded in storage settings 668. Provider specific storage settings (if any) may depend upon storage implementation and in some cases this field is empty or ignored. In some embodiments, a storage setting is used for load management by a data manager. For example, an amount of storage purchased from a storage provider is recorded in 606 so that a data manager can decide where or how to store information based on the storage capacity of the remote storage and/or that of the data source device.

In some cases, remote storage uses its own set of identifiers. If needed, identifier mapping or translation is performed using data mover catalog 608. Using an identifier included in the instruction received from the data manager, controller 601 will (if needed) look up the identifier by which the file system object is known to a data manager (650) to determine the corresponding identifier by which the file system object is known to storage (652). In some embodiments, a file system object is broken up into multiple pieces on storage and multiple identifiers are stored in column 652. In various embodiments, the identifiers stored in column 652 are (e.g., virtual or physical) storage locations, human-readable names, inode numbers, etc.

In some embodiments, a user specifies which of storage interfaces 602 and 604 to use during an initialization process. In some other embodiments, a user provides a storage location or storage address (e.g., a URL or IP address) and data mover 600 goes through the various storage interfaces, attempting to communicate with the storage via the network until one interface is successful. In some embodiments, only one storage interface is active at a time. In some embodiments, more than one storage interface is active at the same time (e.g., the user has an account with both EMC Atmos and Amazon Cloud Drive and wants to use both accounts).

In some embodiments, the configuration shown is attractive because it permits a system to store information with different storage providers and/or permits easy switching from one storage service provider to another. In one example, a user is able to switch from one storage provider to another storage provider without having to reinstall a storage agent on the user's data source device. Settings and user information 606 and data mover catalog 608 would be updated to reflect the new storage provider; in some cases it is not necessary to update the information stored in data manager catalog 502 in FIG. 5 if that information is not storage provider specific.

Figure 7:
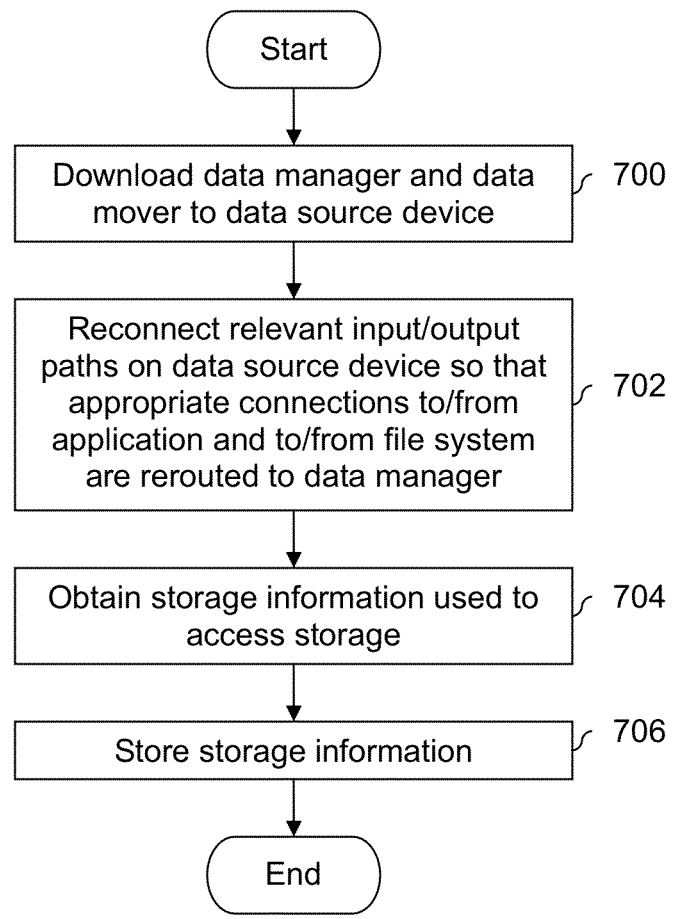
FIG. 7 is a flowchart illustrating an embodiment of a process for installing a storage agent on a data source device.

FIG. 7 is a flowchart illustrating an embodiment of a process for installing a storage agent on a data source device. In some embodiments, the process is run on data source device 100 in FIG. 1 and data manager 404 and data mover 402 from FIG. 4 are downloaded to the data source device. In at least some embodiments, installation does not require the installation of a new file system or operating system. In some embodiments, one or more storage agents which are downloaded to a data source device run on top of a file system or operating system.

At 700, a data manager and data mover are downloaded to a data source device. In various embodiments, a download occurs off of removable media (e.g., a CD or a thumb drive) or from a network accessible site (e.g., going to a website and downloading the data mover and data manager from there).

At 702, relevant input/output paths are reconnected on a data source device so that appropriate connections to/from an application and to/from a file system are rerouted to a data manager. For example, in FIG. 4, one or more connections between application 400 and file system 406 (not shown) are severed. Ports from application 400 are then connected to corresponding ports on data manager 404, and similarly ports from file system 406 are connected to corresponding ports on data manager 404 (not shown). In some embodiments, the data manager is configured as a file system filter driver.

Storage information used to access storage is obtained at 704. For example, a user interface may be presented to a user asking them for the URL, location or name of their storage provider. In some embodiments, a pull down menu (or other control in a user interface) is presented which includes all of the storage types or storage providers supported by a storage agent. In some embodiments, one selection is "None of the above." Other pieces of information obtained include user information and storage settings. For example, if the user indicated they have an EMC Atmos account, a user interface may ask for EMC Atmos storage specific options or settings. In some embodiments, additional information such an amount of storage is obtained at 704. The storage information is stored at 706. For example, fields 660-668 are populated in FIG. 6.

Referring back to FIGS. 5 and 6, after the above initialization process is performed, settings and user information 606 in FIG. 6 may be populated, but data mover catalog 608 in FIG. 6 and data manager catalog 502 and metadata repository 504 in FIG. 5 may be empty. In some cases, those catalogs and repository are populated as a data manager intercepts instructions from an application and learns about existing metadata and existing data. As an example of a learning process, if data manager 500 in FIG. 5 receives an instruction with an identifier it cannot find in data manager catalog 502, it creates a new row for it with the data location and metadata location as "file system." In some embodiments, a data manager catalog is populated by a background task which runs periodically to identify files which need to be moved or migrated to storage.

Figure 8:
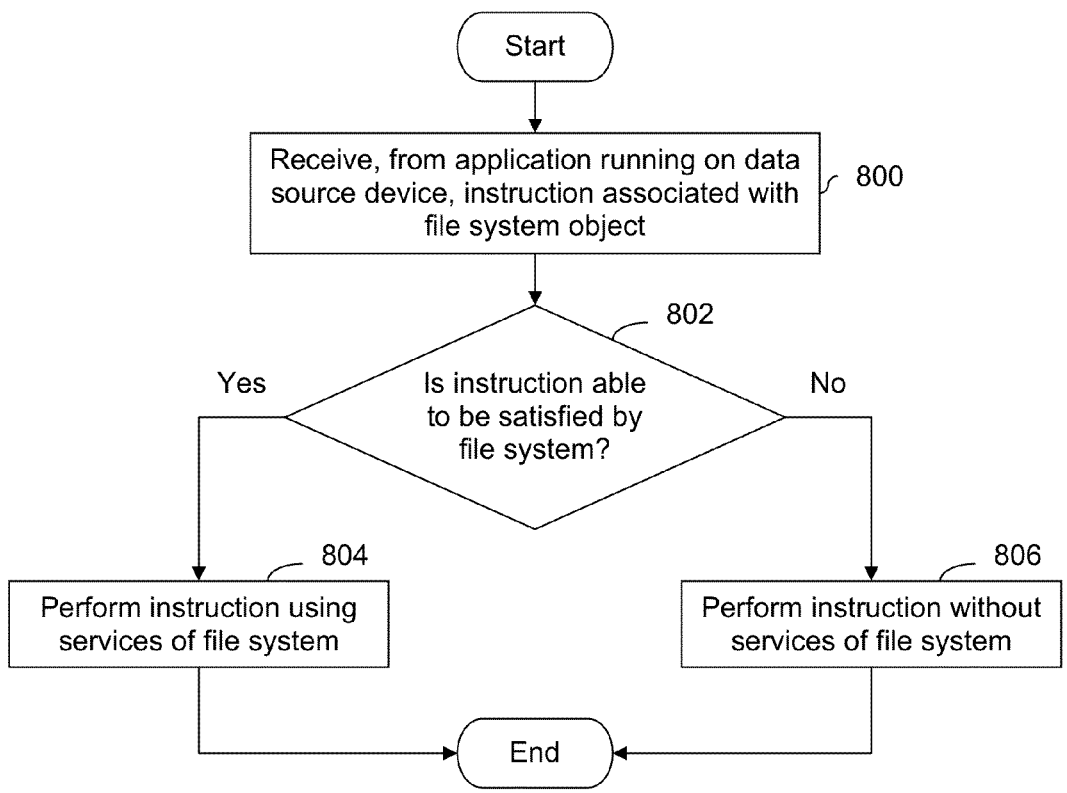
FIG. 8 is a flowchart illustrating an embodiment of a process for processing an instruction received from an application.

FIG. 8 is a flowchart illustrating an embodiment of a process for processing an instruction received from an application. In some embodiments, the process is performed by a data manager and/or a data mover which run on a data source device. At 800, an instruction associated with a file system object is received from an application running on data source device. For example, the instruction may be a read instruction or a write instruction from application 400 in FIG. 4 received at data manager 404. In some embodiments, the instruction relates to metadata associated with a file system object but does not require the data (e.g., file contents) of the file system object to be accessed. For example, the UNIX command ls-l is a request to list the files in the current working directory where the -l option causes UNIX file types, permissions (e.g., readable, writeable and executable), number of hard links, owner, group, size, date and filename to be displayed. This is an example of a request associated with metadata but not data.

It is determined at 802 if an instruction is able to be satisfied by a file system. For example, some information associated with the data may only be managed by one entity and if that entity is not the file system then the file system cannot satisfy the instruction. In some cases, both the file system and another entity (e.g., a storage accessible via a network) can satisfy the instruction and it is determined that the file system can satisfy the request. In some embodiments, records managed by a storage agent running on a data source device are searched using an identifier included in the received request to perform the determination at 802; an example of this is described in further detail below.

If it is decided at 802 that an instruction is able to be satisfied by a file system, then at 804 an instruction is performed using the services of a file system. For example, an instruction may be sent from data manager 404 in FIG. 4 to file system 406; in some embodiments a mapping is performed to map an identifier included in the instruction from the application to an identifier by which the file system knows it. In some embodiments performing an instruction at 804 includes returning a response to the application. For example, if the instruction is a read request then the requested information is received from the file system and returned to the application In some other examples, a confirmation is returned, for example a confirmation that a write instruction has been executed.

If it is determined at 802 that an instruction is not able to be satisfied by a file system, then an instruction is performed without the services of a file system. This is transparent to an application and the application is unaware that some file system objects are managed by an entity other than the file system running on the data source device. For example, the expected responses or behavior of a data manager would exactly mimic or match that of a file system so that an application would be unaware that a given file system object is being stored by and/or managed by an entity other than the file system. The application is unaware that some information is kept on a storage device accessible via a network. In various embodiments, performing an instruction at 806 mapping an identifier included in the instruction from the application (if needed) and sending an instruction to the appropriate entity for execution.

In some embodiments, a storage device accessible via a network performs the instruction at 806. In some embodiments, one or more credentials are exchanged via a network to obtain access to the storage. Some examples of credentials exchanged include a username and password. In some embodiments, a storage device (e.g., specified by a URL or website) provides storage services to multiple users and the credentials exchanged are used (at least in part) to determine which one of the service provider's users is requesting access. In some embodiments, the storage is cloud storage where information is accessible via the web or Internet protocols. In one example, a data mover may communicate via a REST API to read or write information stored in a user's account with a cloud storage provider.

In some embodiments, an agent running on a data source device (e.g., a data manager) performs the instruction at 806. For example, a data manager may store metadata (but not necessarily data) for some/all file system objects. A data manager may be able to satisfy the instruction if (for example) the file system object is not managed by the file system and the instruction relates only to metadata and the metadata in question is stored by the data manager.

Figure 9:
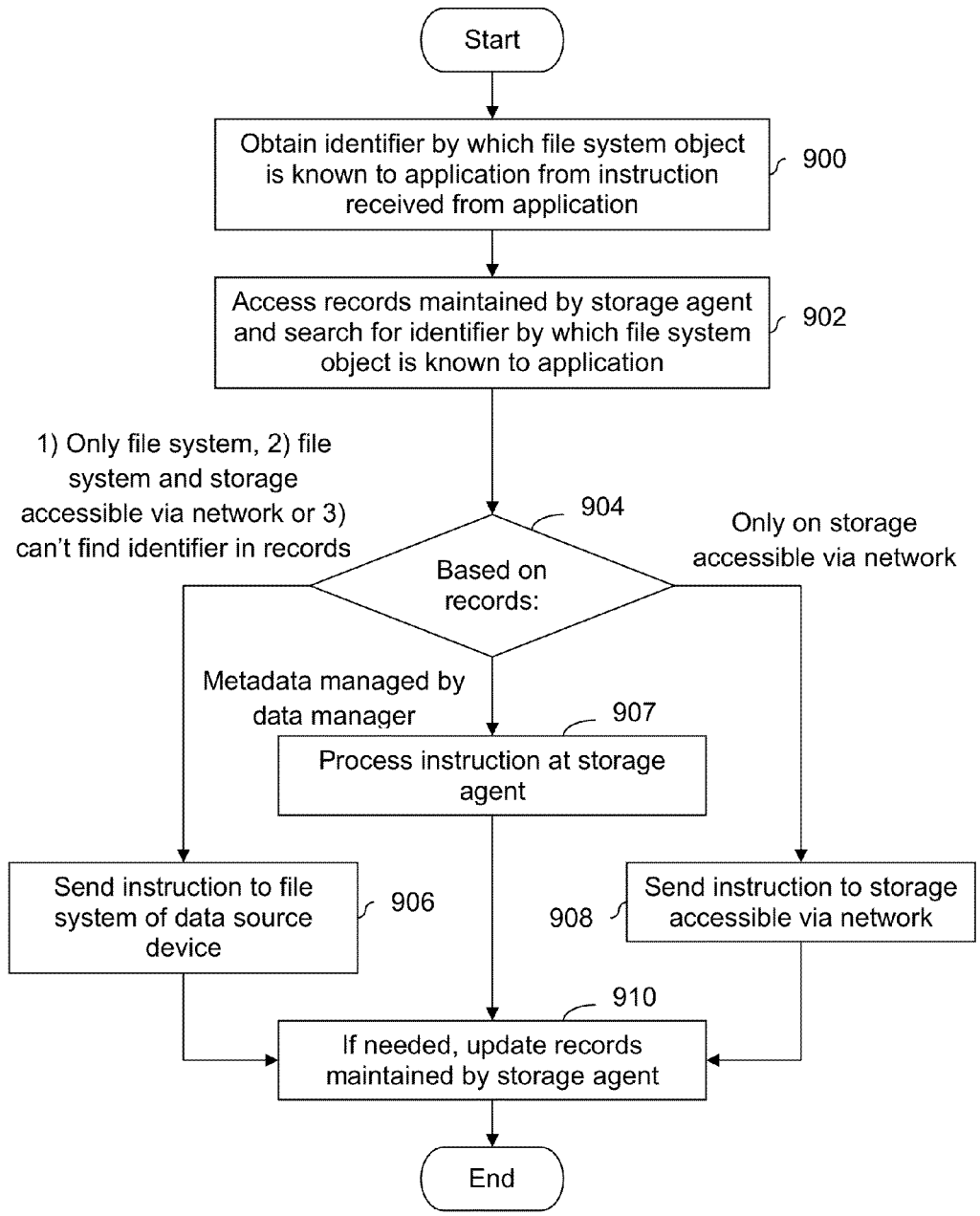
FIG. 9 is a flowchart illustrating an embodiment of a process for determining where to send an instruction.

FIG. 9 is a flowchart illustrating an embodiment of a process for determining where to send an instruction. In some embodiments, the example process shown is used to perform step 802 in FIG. 8 and is performed by a data manager (e.g., data manager 404 in FIG. 4). At 900, an identifier by which a file system object is known to an application is obtained from an instruction received from an application. For example, the instruction may be to return the contents (i.e., data) of <file system object identifier>. At 902, records maintained by a storage agent are accessed and an identifier by which the file system object is known to an application is searched for. For example, in FIG. 5, the identifier A3 may be searched for in data manager catalog 502.

A decision is made at 904 based on the records. If the records indicate 1) the information is stored only by a file system, 2) both the file system and a storage device accessible via network have the information or 3) the identifier cannot be found in the records then the instruction is sent to a file system of a data source device at 906.

If the records indicate the metadata in question is managed by a data manager, then the instruction is processed at the storage agent at 907. For example, data manager 500 in FIG.

5 stores metadata for some or all file system objects in metadata repository 504. Based on the records, the data manager is able to determine that the requested metadata is stored in metadata repository 504 (and no data is requested so the data manager can satisfy the request without requiring the services of a file system or remote storage).

If the records indicate the information is only stored on storage accessible via a network, then the instruction is sent to the storage accessible via a network at 908. For example, if metadata for a given file system object is stored both on remote storage as well as by a data manager on a data source device but the corresponding data is only stored on remote storage, then a request to append additional data to the file system object would be sent to the storage over the network.

After appropriate handling at 906, 907 or 908, records maintained by a storage agent are updated if needed at 910. For example, if the instruction relates to a new file system object, then a new entry in a data manager catalog may be created, for example indicating where the metadata and data for the new file system object are located.

Figure 10:
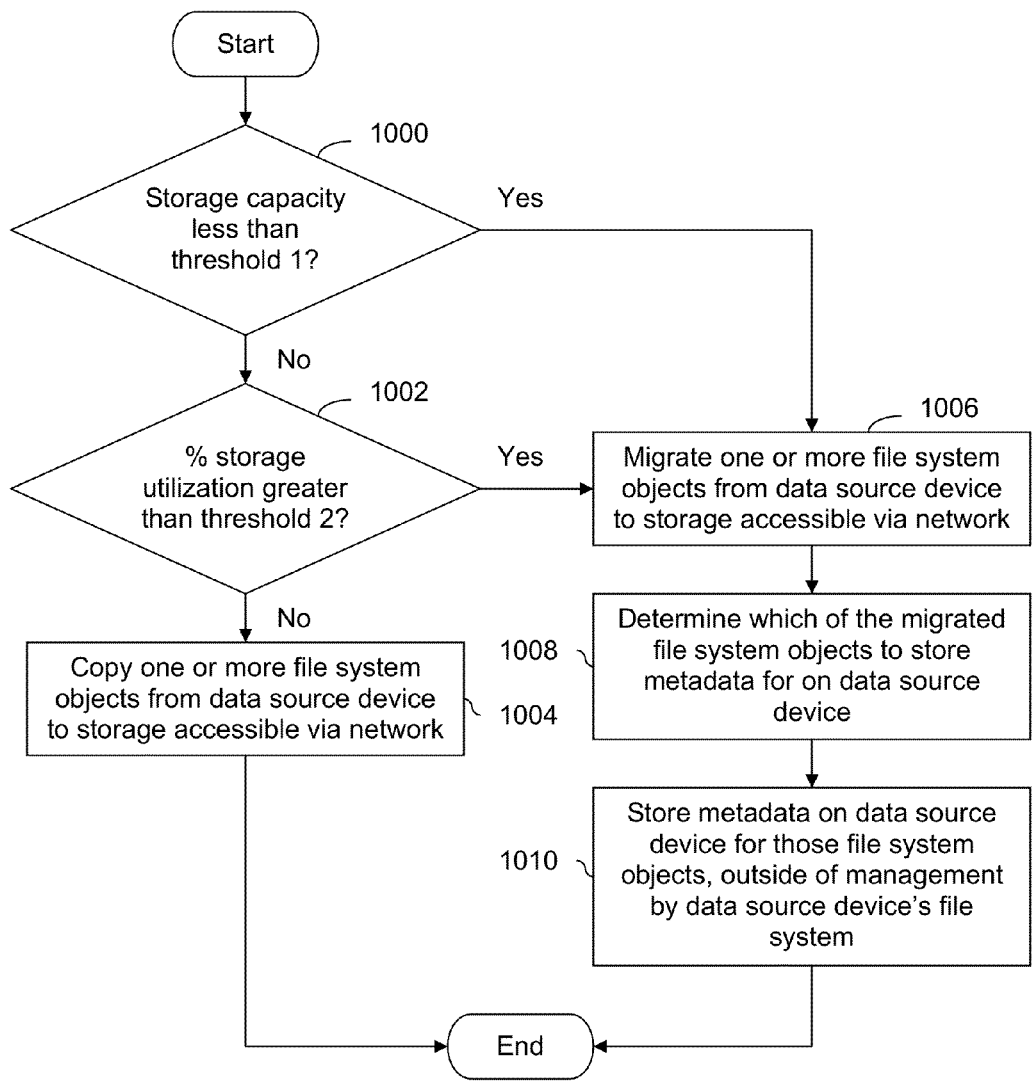
FIG. 10 is a flowchart illustrating an embodiment of a background process for migrating or copying file system objects from a data source device to storage accessible via a network.

FIG. 10 is a flowchart illustrating an embodiment of a background process for migrating or copying file system objects from a data source device to storage accessible via a network. In some embodiments, the process shown is performed by data mover 402 and data manager 404 in FIG. 4. In some embodiments, the process occurs without the knowledge of other entities on a data source device (e.g., application 400 in FIG. 4). In various embodiments, the process is initiated in a variety of ways. In some embodiments, the process begins when an agent (such as a data manager or a data mover) is first downloaded to a data source device. In some embodiments, the process is triggered periodically (e.g., according to a scheduled time). In some embodiments, the process is triggered by some event occurring or condition being satisfied (e.g., storage utilization of a built-in or local disk on a data source device reaching a certain percent utilization).

It is determined at 1000 if storage capacity is less than a first threshold. In one example, the first threshold is a certain number of bytes. In some embodiments, the decision at 1000 does not take into consideration how much storage is used, but rather the size of a local memory on the data source device. Devices with relatively small local or built-in capacity may become full relatively quickly and it may be desirable to migrate file system objects now rather than waiting. If the storage capacity is greater than the first threshold at 1000, it is determined at 1002 if a percentage of storage utilization is greater than a second threshold (e.g., 90% utilization). If the percentage of storage utilization is less than a second threshold at 1002, one or more file system objects are copied from a data source device to storage accessible via a network at 1004. As described above, copying means that a version is kept on a data source device.

If storage capacity is less than a first threshold at 1000 or a percentage of storage utilization is greater than a second threshold at 1002, one or more file system objects are migrated from a data source device to storage accessible via a network at 1006. In some embodiments, migrating at 1006 includes deleting data and metadata for the migrated file system objects from the file system of a data source device and migration at 1006 includes generating a delete instruction to be processed by the file system. In some embodiments, copying at 1004 does not include such a delete instruction for the copied file system objects. In some embodiments, if a file system object is already copied to the storage (for example in step 1004), then step 1006 involves only deletion of the object from the local file system.

It is determined at 1008 which of the migrated file system objects to store metadata for on a data source device. In some embodiments, metadata for those file system objects which are most frequently accessed are stored on a data source device. In some embodiments, metadata for all migrated file system objects is stored on a data source device. At 1010, metadata is stored on a data source device for those file system objects, outside of management by a data source device's file system. For example, the metadata may be stored in metadata repository 504 under the management of data mover 500 in FIG. 5. In some embodiments, the types or fields of metadata which are stored at 1010 are those which would be requested by a file system (graphical) user interface, such as Microsoft Windows Explorer or a command in a command line interface to list directory contents (e.g., ls or dir). This may be desirable since contents of a directory may be presented to user, along with any pertinent or requested properties of the contents of the directory, without having to communicate over a network to access remote storage. In some embodiments, metadata for a file system object is stored in the same object as a file system extended attribute, in addition to, or instead of, the file data.

In various embodiments, various techniques may be used to migrate or copy file system objects at 1006 and 1004, respectively. In some embodiments, all file system objects are copied or migrated. In some embodiments, specific file system objects are selected for copying or migration based on user input. For example, a user may indicate certain types of files are to be protected (e.g., spreadsheets, word processing documents and database files) whereas others do not need to be protected or should only be protected if there is available space (e.g., photographs and music files). In some embodiments, if all file system objects can fit into a user account on remote storage then all file system objects are copied or migrated. In some embodiments, copying or migrating a file system object includes storing metadata for that file system object on the storage accessible via a network. This metadata may be used in presenting a copy of a file system object on remote storage to a user or application if so requested by a device other than the data source device (e.g., access to a file system object on storage 106 in FIG. 1 is requested by remote device 102) and so keeping metadata with its corresponding data on remote storage may be useful since without metadata the corresponding data may be less useful. In some embodiments, metadata stored on storage device 106 includes additional information such as the identity of the data source 100, or the full file system path on the data source 100.

Figure 11:
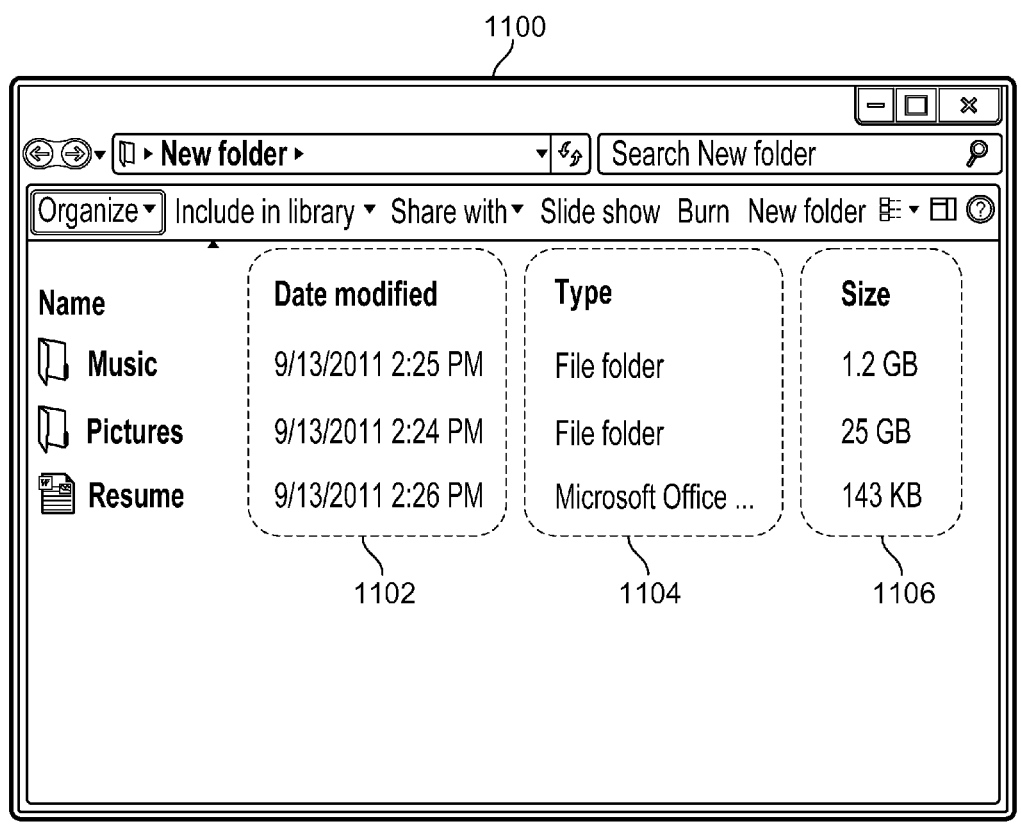
FIG. 11 is a diagram showing an embodiment of a file system GUI which displays metadata stored on a data source device where the corresponding data is not stored on a data source device.

FIG. 11 is a diagram showing an embodiment of a file system GUI which displays metadata stored on a data source device where the corresponding data is not stored on a data source device. In the example shown, file system GUI 1100 is a Windows Explorer window which shows the contents of a directory called New folder. Modification timestamps 1102, types 1104 and size 1106 are metadata which is kept on a data source device where the corresponding data (e.g., the contents of the Resume file) are not kept on the data source device. For example, metadata 1102-1106 is stored in metadata repository 504 in FIG. 5 and is managed by a data manager as opposed to a file system of a data source device. Storing metadata 1102-1106 on a data source device as described may be attractive because it permits file system GUI 1100 to be presented to a user without having to access remote storage via a network, even if a data source device has limited storage capacity. Not accessing storage via a network may be desirable since staying "on device" is faster and does not consume network bandwidth.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of managing information, comprising:
using a data manager to migrate content associated with a backup-related file system object from a data source device to a remote storage device such that after the migration: (1) the content associated with the backup-related file system object is stored on the remote storage device and not on the data source device and (2) metadata associated with the backup-related file system object is stored at least by the data manager on the data source device and not by a file system below the data manager on the data source device, wherein the metadata stored by the data manager includes a backup identifier;
receiving, from an application running on the data source device, an instruction that requires access to at least one of the metadata and the content associated with the backup-related file system object in order to be satisfied;
determining, at the data manager, that the metadata associated with the backup-related file system object is located in the data manager;
determining, at the data manager, that the instruction is a metadata-only type of instruction that requires access to only the metadata associated with the backup-related file system object in order to be satisfied; and
performing the instruction, including by accessing, in the data manager, the backup identifier associated with the backup-related file system object, wherein: (1) the instruction is satisfied without requiring services of the file system below the data manager and (2) the instruction is satisfied without requiring services of the remote storage device.

2. The method of claim 1, wherein the metadata associated with the backup-related file system object includes one or more of the following: a name associated with the backup-related file system object, a size associated with the backup-related file system object, a creator associated with the backup-related file system object, a creation timestamp associated with the backup-related file system object, a modification timestamp associated with the backup-related file system object or a permission associated with the backup-related file system object.

3. The method of claim 1, wherein the data manager is further configured to:
act as an intermediary between the application and the file system running on the data source device;
store a catalog comprising metadata and content locations that correspond to a plurality of file system objects; and
determine, based at least in part on the catalog, the respective locations of the metadata and the content associated with the backup-related file system object.

4. The method of claim 1, further comprising installing the data manager on the data source device, including by:
severing a connection between an application port associated with the application running on the data source device and a file system port associated with the file system running on the data source device;
creating a first connection between the application port and a first port associated with the data manager; and
creating a second connection between the file system port and a second port associated with the data manager.

5. The method of claim 1, wherein the backup identifier stored by the data manager includes one or more of the following: a backup version or a backup timestamp.

6. The method of claim 1, wherein:
the application includes a backup and restore application, and
the instruction includes an instruction associated with displaying identifying information associated one or more backed up copies of file system objects that are available for restoration, wherein the instruction does not require access to the contents of the backed up copies of file system objects that are available for restoration in order to be satisfied.

7. The method of claim 6, wherein:
performing the instruction includes returning a backup time to the backup and restore application; and
the backup time is displayed in a user interface associated with displaying backed up copies of file system objects that are available for restoration.

8. The method of claim 6, wherein the user interface is configured to initially display identifying information for a predefined number of backed up copies of file system objects that are available for restoration.

9. The method of claim 8, wherein the user interface is further configured to display a button associated with displaying identifying information for one or more additional backed up copies of one or more file system objects that are available for restoration.

10. The method of claim 9, wherein the user interface is further configured to display: (1) a first button associated with displaying identifying information for one or more additional backed up copies of a first file system object that are available for restoration and (2) a second button associated with displaying identifying information for one or more additional backed up copies of a second file system object that are available for restoration.

11. The method of claim 1, wherein:
the application includes a block-based backup and restore application; and
the content associated with the backup-related file system object is stored on the remote storage device at block level.

12. A system for managing information, comprising a data source device and a data manager running on the data source device, wherein the data manager is configured to:
migrate content associated with a backup-related file system object from the data source device to a remote storage device such that after the migration: (1) the content associated with the backup-related file system object is stored on the remote storage device and not on the data source device and (2) metadata associated with the backup-related file system object is stored at least by the data manager on the data source device and not by a file system below the data manager on the data source device, wherein the metadata stored by the data manager includes a backup identifier;
receive, from an application running on the data source device, an instruction that requires access to at least one of the metadata and the content associated with the backup-related file system object in order to be satisfied;
determine that the metadata associated with the backup-related file system object is located in the data manager;
determine that the instruction is a metadata-only type of instruction that requires access to only the metadata associated with the backup-related file system object in order to be satisfied; and perform the instruction, including by accessing the backup identifier associated with the backup-related file system object, wherein: (1) the instruction is satisfied without requiring services of the file system below the data manager and (2) the instruction is satisfied without requiring services of the remote storage device.

13. The system of claim 12, wherein the data manager is further configured to:
   act as an intermediary between the application and the file system running on the data source device;
   store a catalog comprising metadata and content locations that correspond to a plurality of file system objects; and
   determine, based at least in part on the catalog, the respective locations of the metadata and the content associated with the backup-related file system object.

14. The system of claim 12, wherein the data manager is installed on the data source device at least in part by:
   severing a connection between an application port associated with the application running on the data source device and a file system port associated with the file system running on the data source device;
   creating a first connection between the application port and a first port associated with the data manager; and
   creating a second connection between the file system port and a second port associated with the data manager.

15. The system of claim 12, wherein the backup identifier stored by the data manager includes one or more of the following: a backup version or a backup timestamp.

16. The system of claim 12, wherein:
   the application includes a backup and restore application, and
   the instruction includes an instruction associated with displaying identifying information associated one or more backed up copies of file system objects that are available for restoration, wherein the instruction does not require access to the contents of the backed up copies of file system objects that are available for restoration in order to be satisfied.

17. The system of claim 16, wherein:
   the data manager is configured to perform the instruction, including by returning a backup time to the backup and restore application; and
   the backup time is displayed in a user interface associated with displaying backed up copies of file system objects that are available for restoration.

18. The system of claim 16, wherein the user interface is configured to initially display identifying information for a predefined number of backed up copies of file system objects that are available for restoration.

19. The system of claim 18, wherein the user interface is further configured to display a button associated with displaying identifying information for one or more additional backed up copies of one or more file system objects that are available for restoration.

20. The system of claim 19, wherein the user interface is further configured to display: (1) a first button associated with displaying identifying information for one or more additional backed up copies of a first file system object that are available for restoration and (2) a second button associated with displaying identifying information for one or more additional backed up copies of a second file system object that are available for restoration.

21. The system of claim 12, wherein:
   the application includes a block-based backup and restore application; and
   the content associated with the backup-related file system object is stored on the remote storage device at block level.

22. A computer program product for managing information, the computer program product comprising a non-transitory computer readable storage medium storing computer instructions for:
   migrating content associated with a backup-related file system object from a data source device to a remote storage device such that after the migration: (1) the content associated with the backup-related file system object is stored on the remote storage device and not on the data source device and (2) metadata associated with the backup-related file system object is stored at least by a data manager on the data source device and not by a file system below the data manager on the data source device, wherein the metadata stored by the data manager includes a backup identifier;
   receiving, from an application running on the data source device, an instruction that requires access to at least one of the metadata and the content associated with the backup-related file system object in order to be satisfied;
   determining, at the data manager, that the metadata associated with the backup-related file system object is located in the data manager;
   determining, at the data manager, that the instruction is a metadata-only type of instruction that requires access to only the metadata associated with the backup-related file system object in order to be satisfied; and
   performing the instruction, including by accessing, in the data manager, the backup identifier associated with the backup-related file system object, wherein: (1) the instruction is satisfied without requiring services of the file system below the data manager and (2) the instruction is satisfied without requiring services of the remote storage device.

23. The computer program product of claim 22, wherein the data manager is further configured to:
   act as an intermediary between the application and the file system running on the data source device;
   store a catalog comprising metadata and content locations that correspond to a plurality of file system objects; and
   determine, based at least in part on the catalog, the respective locations of the metadata and the content associated with the backup-related file system object.

24. The computer program product of claim 22, further comprising computer instructions for installing the data manager on the data source device, including by:
   severing a connection between an application port associated with the application running on the data source device and a file system port associated with the file system running on the data source device;
   creating a first connection between the application port and a first port associated with the data manager; and
   creating a second connection between the file system port and a second port associated with the data manager.

25. The computer program product of claim 22, wherein the backup identifier stored by the data manager includes one or more of the following: a backup version or a backup timestamp.

26. The computer program product of claim 22, wherein:
   the application includes a backup and restore application, and
   the instruction includes an instruction associated with displaying identifying information associated one or more backed up copies of file system objects that are available for restoration, wherein the instruction does not require access to the contents of the backed up copies of file system objects that are available for restoration in order to be satisfied.

27. The computer program product of claim 26, wherein:
the computer instructions for performing the instruction include computer instructions for returning a backup time to the backup and restore application; and
the backup time is displayed in a user interface associated with displaying backed up copies of file system objects that are available for restoration.

28. The computer program product of claim 26, wherein the user interface is configured to initially display identifying information for a predefined number of backed up copies of file system objects that are available for restoration.

29. The computer program product of claim 28, wherein the user interface is further configured to display a button associated with displaying identifying information for one or more additional backed up copies of one or more file system objects that are available for restoration.

30. The computer program product of claim 29, wherein the user interface is further configured to display: (1) a first button associated with displaying identifying information for one or more additional backed up copies of a first file system object that are available for restoration and (2) a second button associated with displaying identifying information for one or more additional backed up copies of a second file system object that are available for restoration.

31. The computer program product of claim 22, wherein:
the application includes a block-based backup and restore application; and
the content associated with the backup-related file system object is stored on the remote storage device at block level.

\* \* \* \* \*